(No Model.)
L. BENDIT.
DEVICE FOR THROWING OUT OF GEAR BELT GEARING.
No. 572,098. Patented Dec. 1, 1896.
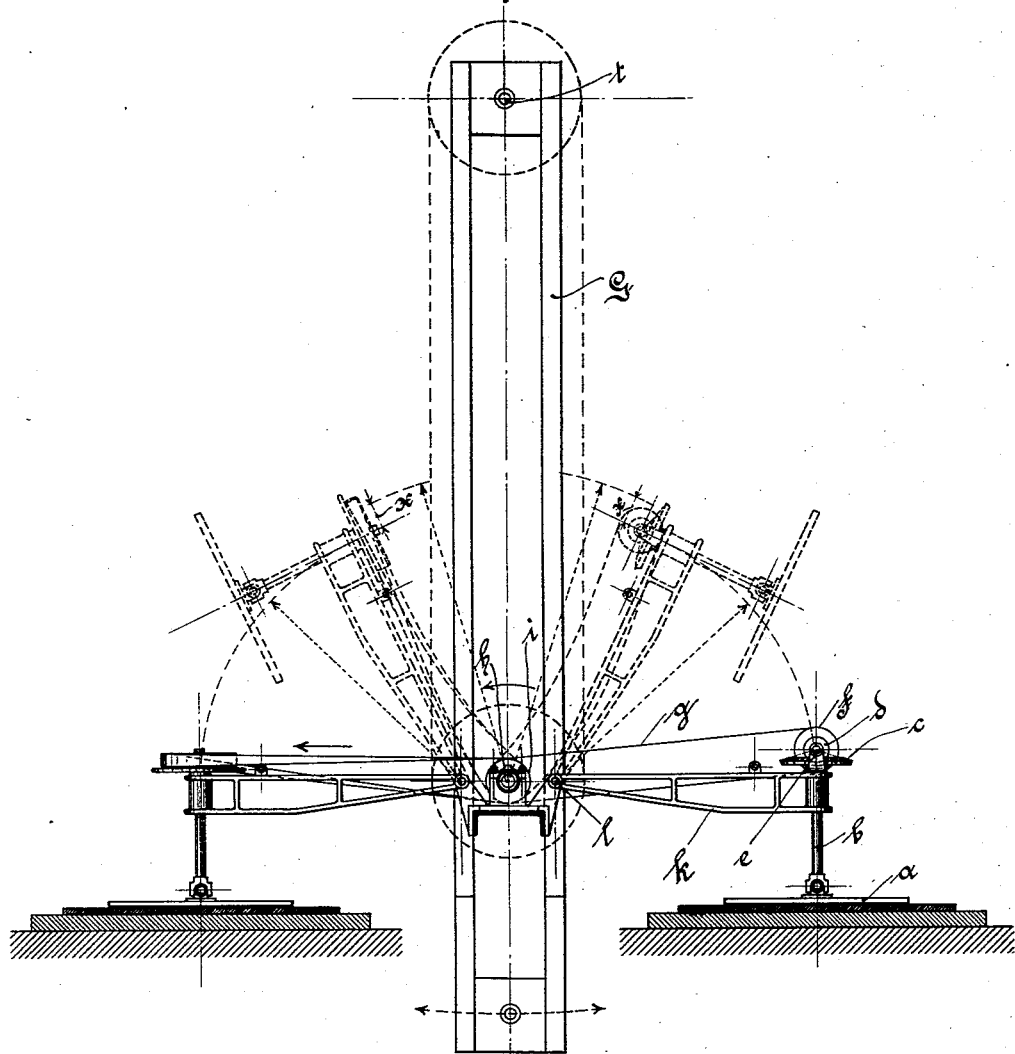
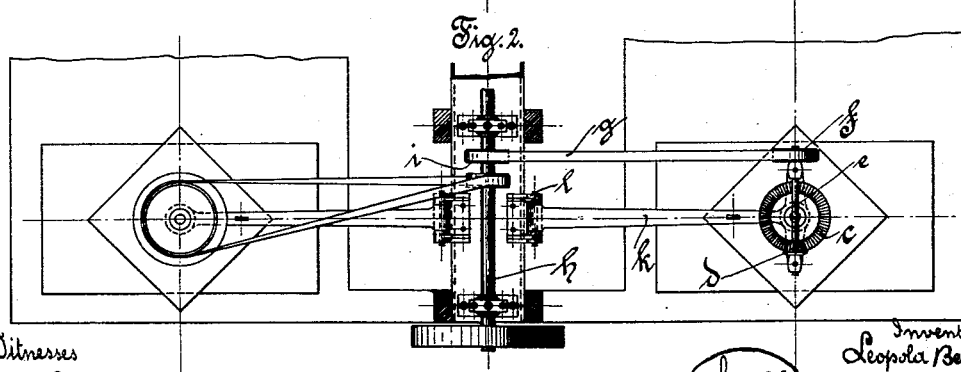
Witnesses
H. van Oldenneel
E. A. Scott
Inventor
Leopold Bendit
by Richards
Attorneys

UNITED STATES PATENT OFFICE.

LEOPOLD BENDIT, OF FUERTH, GERMANY.

DEVICE FOR THROWING OUT OF GEAR BELT-GEARING.

SPECIFICATION forming part of Letters Patent No. 572,098, dated December 1, 1896.

Application filed April 30, 1896. Serial No. 589,704. (No model.)

*To all whom it may concern:*

Be it known that I, LEOPOLD BENDIT, manufacturer, a subject of the King of Bavaria, and a resident of Fuerth, Bavaria, German Empire, have invented certain new and useful Improvements in Devices for Throwing Out of Gear Belt-Gearings, of which the following is a specification.

Machines with rotary tools which must be frequently thrown into or out of gear during operation are not only expensive on account of the speedy wearing out of the belts, but the work itself suffers often by the cracking of the belts.

The object of this invention is to remedy these defects by rendering unnecessary the lateral shifting of the belts for throwing into or out of gear. This result is obtained by the following arrangement: The axle of the tool, together with the belt-pulley for driving the same, is journaled upon a lever-arm which pivots around a point between the driving and the driven shaft. Thus when the said lever-arm is turned there will be a change in the distance between the shafts, and in consequence thereof the belt will hang loose between the same and no power will be transmitted.

The accompanying drawings show as an instance a grinding and polishing machine constructed in accordance with the idea of this invention.

Figure 1 is an elevation. Fig. 2 is a plan view.

The tool consists of a grinding-plate $a$, the shaft $b$ of which is put in a rotary motion by the shaft $e$ and the wheel-gearing $c$ $d$, carrying along the plate in that motion. The impellent power is given by the belt-sheave $f$, connected with the belt-sheave $i$ upon the common driving-shaft $h$ by a belt $g$. The shaft $e$ is journaled upon the lever-arm $k$, which pivots around the axle $l$, placed before the driving-shaft $h$. If this lever, the turning of which is a requisite for throwing the tool into or out of gear, is turned upward around its axle $l$, the distance between the shafts will decrease for the distance $x$. Thus the belt $g$ will hang loose from the sheave $f$ and no transmission of power will take place. There will thus be seen that at the same time the tool is raised a throwing out of gear thereof will be produced without separate apparatus or handle. By turning down the arm K the belt will become tight again and the tool will be put in operation. As this throwing into and out of gear is effected without lateral shifting of the belt and without touching the same at all, it is evident that there will be a great saving, especially of cross-belts of all kinds. The fact that neither a loose pulley nor a pulley of double width is required is also an economy in the construction.

A great advantage of this new construction is, further, that it can be used for the throwing into and out of gear of half-crossed belts, so that disengaging conical wheel-gearings can be replaced by a simple belt-gearing.

I claim—

In belt-gearing, the combination of the driving-shaft extending horizontally and having a pulley thereon, the vertical driven shaft $b$, the horizontal shaft $e$, the gearing between the shafts $b$ and $e$, the bracket carrying the shafts $b$ and $e$, extending therefrom horizontally and pivoted at a point between the driving-shaft and the tool-shaft $b$, the pulley on the horizontal shaft $e$ and the belt forming the direct connection between the driving-pulley and the pulley on the shaft $e$, said belt being slackened by the lifting of the bracket $k$, substantially as described.

In witness whereof I have hereunto set my hand in presence of two witnesses.

LEOPOLD BENDIT.

Witnesses:
   JACOB SPRINGER,
   CHAS. E. CARPENTER.